United States Patent
Denkewicz, Jr. et al.

(10) Patent No.: US 6,200,487 B1
(45) Date of Patent: *Mar. 13, 2001

(54) IN-LINE, IN-POOL WATER PURIFICATION SYSTEM

(75) Inventors: Raymond P. Denkewicz, Jr., Warwick; Alvin Costa, Tiverton; Daniel J. Nelsen; Aidan J. Petrie, both of Providence, all of RI (US)

(73) Assignee: Zodiac Pool Care, Inc., Smithfield, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/178,879

(22) Filed: Oct. 26, 1998

Related U.S. Application Data

(63) Continuation-in-part of application No. 08/964,782, filed on Nov. 5, 1997, now Pat. No. 5,882,512.

(51) Int. Cl.⁷ .................................. E04H 4/16; C02F 1/68
(52) U.S. Cl. ..................... 210/749; 210/169; 210/206; 210/416.2; 15/1.7; 422/265; 422/278
(58) Field of Search ..................... 210/749, 764, 210/169, 198.1, 206, 258, 416.2; 422/265, 274, 278; 15/1.7

(56) References Cited

U.S. PATENT DOCUMENTS

| | | |
|---|---|---|
| 4,504,387 | 3/1985 | LeMire et al. . |
| 4,558,479 | 12/1985 | Greskovics et al. . |
| 4,652,366 | 3/1987 | Brooks . |
| 4,691,732 * | 9/1987 | Johnson et al. . |
| 4,703,955 | 11/1987 | Brooks . |
| 4,776,954 | 10/1988 | Brooks . |
| 4,778,599 | 10/1988 | Brooks . |
| 4,835,809 | 6/1989 | Roumagnac . |
| 4,839,063 | 6/1989 | Brooks . |
| 5,014,382 | 5/1991 | Kallenbach . |
| 5,225,074 * | 7/1993 | Moini . |
| 5,234,588 | 8/1993 | Aymes . |
| 5,269,913 * | 12/1993 | Atkins . |
| 5,311,631 * | 5/1994 | Smith, Jr. . |
| 5,317,776 | 6/1994 | De Moura . |
| 5,350,509 | 9/1994 | Nelson . |
| 5,352,369 | 10/1994 | Heinig, Jr. . |
| 5,546,892 | 8/1996 | Clark et al. . |
| 5,554,277 * | 9/1996 | Rief et al. . |
| 5,660,802 | 8/1997 | Archer et al. . |
| 5,743,287 * | 4/1998 | Rauchwerger . |
| 5,772,896 | 6/1998 | Denkewicz, Jr. et al. . |
| 5,827,434 * | 10/1998 | Yando . |
| 5,882,512 * | 3/1999 | Denkewicz, Jr. et al. . |
| 5,976,385 * | 11/1999 | King . |
| 6,119,707 * | 9/2000 | Jordan . |

FOREIGN PATENT DOCUMENTS 0590762   4/1994   (EP) .

* cited by examiner

Primary Examiner—David A. Simmons
Assistant Examiner—Fred Prince
(74) Attorney, Agent, or Firm—Dean W. Russell; Kilpatrick Stockton LLP

(57) ABSTRACT

An in-line, in-pool system for chemically treating water in conjunction with an automatic swimming pool cleaner is disclosed. Incorporating a head and a cartridge, the system is design for placement within a swimming pool for treating water therein. Purification media may be placed within the cartridge to effect sanitization of the water.

21 Claims, 2 Drawing Sheets

IN-LINE, IN-POOL WATER PURIFICATION SYSTEM

This application is a continuation-in-part of and claims, under 35 U.S.C. § 120, benefit of the filing date of U.S. patent application Ser. No. 08/964,782 (now U.S. Pat. No. 5,882,512), filed Nov. 5, 1997, entitled "Automatic Swimming Pool Cleaners and Associated Components and Systems."

FIELD OF THE INVENTION

This invention relates to water purification systems and more particularly to equipment and techniques for purifying water contained in swimming pools using devices adapted to be placed within pools intermediate automatic swimming pool cleaners and inlets or outlets of the filtration systems of such pools.

BACKGROUND OF THE INVENTION

Numerous commercially-available automatic swimming pool cleaners exist. Although some utilize electricity to power internal pumps and motors, many connect instead (indirectly) to pumps located externally of the pools. Using flow of water to or from the pumps, the automatic pool cleaners themselves traverse the bottoms (and sometimes walls and other surfaces) of pools, vacuuming debris resting thereon.

Automatic pool cleaners connected, indirectly, to the inlet of pumps are often called "suction-side" cleaners, as the suction created by the pumps draws, or evacuates, water through the cleaners. One example of a suction-side cleaner is illustrated in U.S. Pat. No. 5,014,382, which patent is incorporated herein in its entirety by this reference. The cleaner includes a valve (which may but need not necessarily be a diaphragm), which in use periodically interrupts the flow of water through the cleaner body. The interruption in flow assists in moving the cleaner about the bottom (and other surfaces) of a swimming pool.

By contrast, automatic pool cleaners connected (again indirectly) to outlets of pumps are termed "pressure-side" cleaners. U.S. Pat. No. 4,835,809 to Roumagnac, also incorporated herein in its entirety by this reference, discloses an example of such a pressure-side cleaner. According to the Roumagnac patent, the cleaner connects to the "recycle mouth," or return line, of the pool filtration system. Flow of pressurized water through the cleaner creates a low-pressure region within its body, permitting aspiration of debris-laden water from the pool into the body.

Although capable of removing detritus from pools, automatic swimming pool cleaners historically have been unable to assist in purifying water chemically. Instead, such purification has sometimes occurred using devices wholly separate from the automatic cleaners. These devices frequently include pressure vessels and are located externally of the pools themselves.

U.S. Pat. No. 4,504,387 to LeMire, et al. discloses exemplary equipment for purifying bodies of water, including swimming pools, spas, and hot tubs, utilized recreationally by human beings. As shown in FIG. 1 of the LeMire, et al. patent, swimming pools conventionally include pumps, filters, and recycling systems; while a pump is operating, water is continually withdrawn from a pool, passed through a filter, and returned to the pool via the recycling system. By positioning water purification equipment between the outlet of the pump and the return mouth of the pool, pressurized water exiting the pump can be purified prior to its return to the pool.

Water purification equipment of the type detailed in the LeMire patent is, as suggested above, designed for placement outside the boundaries of the pool. Consequently, it includes a stand or base on which an outer casing is positioned. The stand maintains the casing in an upright stance, whether located above soil, concrete, or asphalt.

The casing, moreover, contains an inlet and an outlet, both of which are plumbed into the recycling system of the pool. As a result, the water purification equipment is closed to the ambient environment and receives only water passed from the outlet of the pump. By this reference applicants incorporate herein the entirety of the LeMire, et al. patent, as well as the entireties of U.S. Pat. Nos. 5,352,369 to Heinig, Jr., 5,660,802 to Archer, et al., and 5,772,896 to Denkewicz, Jr., et al., which disclose other equipment and techniques for purifying water.

U.S. Pat. No. 5,269,913 to Atkins, additionally incorporated herein in its entirety by this reference, describes a mechanical debris trap for use in connection with suction-side automatic swimming pool cleaners. As recited in the Atkins patent, the trap has an internal strainer, or filter, and > a "T" configuration, with the inlet/outlet tube making up the top of the "T" and a housing containing the filter and a relief valve, drain, or similar device making up the base of the "T." The inlet/outlet tube is intersected at midpoint by a tube or downspout perpendicular to the inlet/outlet tube that prevents direct flow through the inlet/outlet tube but is open on the inlet side. The perpendicular tube penetrates the filter and terminates in an open end within the filter.

See Atkins, col. 2, lines 10–18. The trap is spliced into a flexible hose leading to an automatic pool cleaner; in use, "[w]ater and debris entering the inlet are directed downward into the interior of the filter by the perpendicular tube," id., lines 32–34, with debris being trapped within the filter and water migrating through the filter to the outlet of the trap.

The debris trap of the Atkins patent additionally (optionally) includes a relief valve in the bottom of the housing. As described therein, the valve "allows water to be drawn into the housing to balance the fluid flow to or from the cleaner head." Id., lines 40–42. Such drawing occurs when the pool cleaner or a system regulator valve becomes plugged or blocked and is intended to equalize the pressure within the overall filtration system. See id., col. 4, lines 8–14. The primary water flow through the trap, therefore, remains via the inlet/outlet tube.

Neither the LeMire nor the Atkins patent details equipment adapted to purify water chemically while the water is within a swimming pool. Likewise, neither patent addresses use of any equipment designed to cooperate with both pressure- and suction-side automatic swimming pool cleaners. Accordingly, for at least these reasons an in-line, in-pool system for chemically treating water in conjunction with an automatic swimming pool cleaner (whether suction- or pressure-side) would be useful.

SUMMARY OF THE INVENTION

The present invention provides such a system. Incorporating a head and a cartridge, the system is designed for placement within swimming pools so as chemically to treat water within the volumes of the pools. The device of the system additionally is intended to be positioned intermediate an automatic (or conceivably, in some cases, manual) swimming pool cleaner and either the inlet or the outlet of the pool filtration system, thus cooperating with the automatic pool cleaner employed in each pool.

In at least some embodiments of the invention, the same cartridge (and possibly the same head) may be used regardless of whether the associated automatic pool cleaner is a suction- or pressure-side cleaner. In these embodiments the cartridge additionally includes media adapted to sanitize water. Although the media may be similar to any of those described in the Heinig, Jr. or Denkewicz, Jr., et al. patents, it need not necessarily be so, and any other suitable water purification chemistry may be used instead. The media within the cartridge can be disposable if desired, in which case the cartridge may be opened to remove the media and re-closed following its replacement. Alternatively, the cartridge itself may be replaced.

Openings in the top and bottom portions of the cartridge permit water to flow completely therethrough, facilitating contact of the to-be-sanitized water with the media contained therein. An inlet/outlet tube, in some respects similar to that shown in the Atkins patent (and preferably, although not necessarily, tubular in shape), is formed in the head. The tube is not wholly continuous through the head, but rather includes either a secondary opening or a gap (or cavity) between the inlet and outlet to permit fluid communication with the cartridge.

In embodiments of the device adapted for use with suction-side cleaners, a float may be positioned within the head for improved buoyancy of the device. In such case the float may also have an opening to avoid inhibiting fluid communication between the tube and cartridge. The float alternatively may be formed integrally with the head, located outside the head, or otherwise positioned as desired respecting the remainder of the device.

When used with a suction-side cleaner, a device of the present invention is interposed in a pool between the cleaner and the inlet of a pump. Suction caused by action of the pump draws water from the automatic pool cleaner through the tube (including past the gap), from inlet to outlet. The suction additionally draws water from the pool up into the cartridge, where it contacts the purification media, and thence through the gap into the tube where it joins the water stream from the automatic pool cleaner for passage to the filtration system outside the pool.

When used with a pressure-side cleaner, alternatively, the device of the present invention is positioned in the pool between the cleaner and the outlet of the pump. Pressurized water exiting the pump passes through the inlet/outlet tube in two streams, one of which exits the outlet of the tube to power the automatic pool cleaner and the other of which travels through the secondary opening. This other stream then proceeds down through the cartridge (thus contacting the sanitizing media) and into the swimming pool.

It is therefore an object of the present invention to provide equipment and techniques for treating water within a (typically recreational) body, such as a pool, spa, or hot tub, through which water circulates.

It is also an object of the present invention to provide devices for purifying water useful in conjunction with an automatic swimming pool cleaner, whether suction- or pressure-side.

It is a further object of the present invention to provide equipment incorporating a head and a cartridge, at least the latter being adapted for placement in a pool intermediate an automatic swimming pool cleaner and either the inlet or the outlet of the filtration system of the pool.

It is another object of the present invention to provide systems in which the same cartridge may be utilized regardless of whether the associated automatic pool cleaner is a suction- or pressure-side cleaner.

It is an additional object of the present invention to provide reclosable or replaceable cartridges so as to permit disposal and replacement of the purification media contained therein.

Other objects, features, and advantages of the present invention will become apparent to those skilled in the art with reference to the remainder of the text and the drawings of this application.

DETAILED DESCRIPTION

Figure 1:
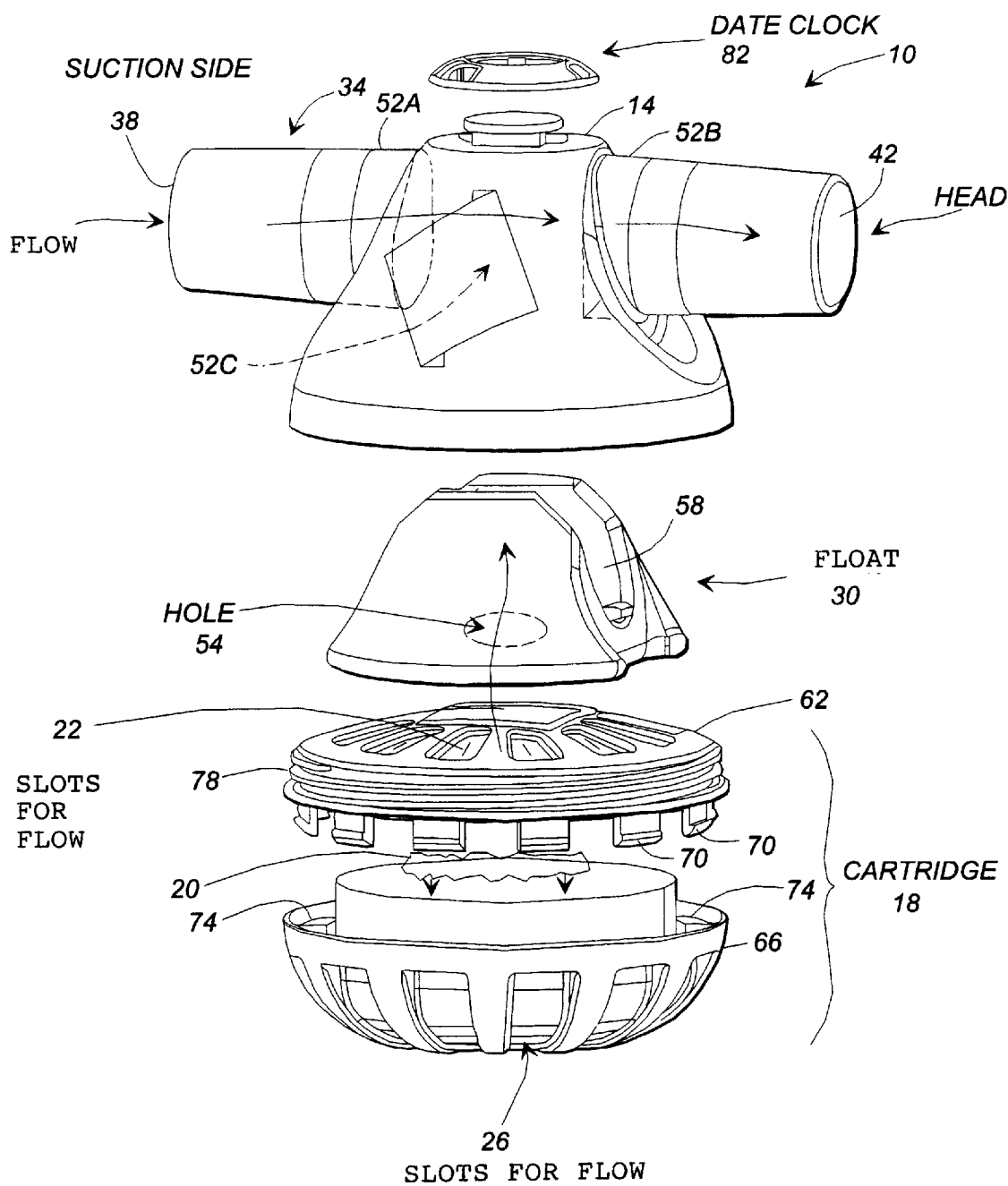
FIG. 1 is an exploded perspective view of a device of the present invention adapted especially for use with a suction-side automatic swimming pool cleaner.
Figure 2:
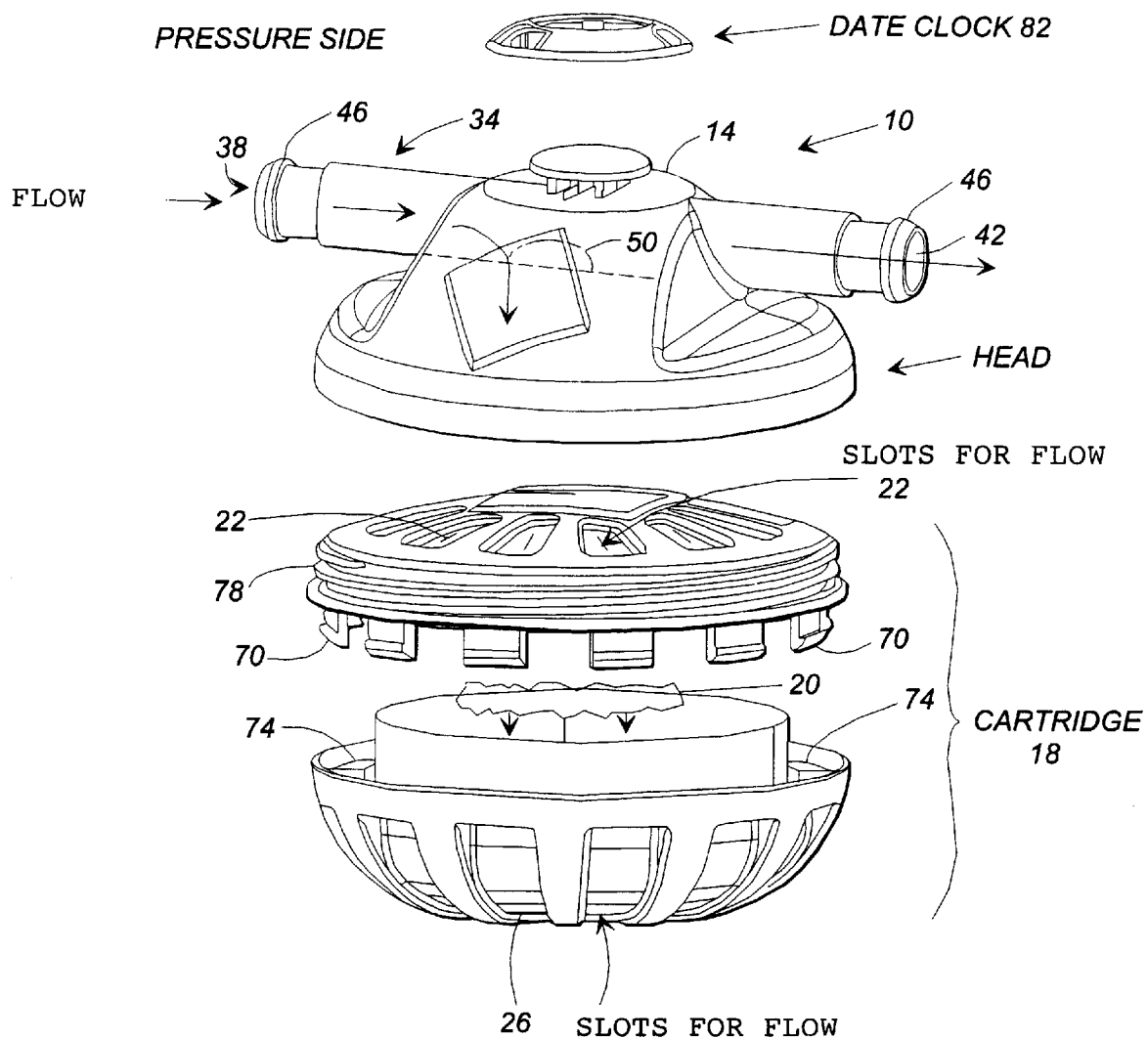
FIG. 2 is an exploded perspective view of a device of the present invention adapted especially for use with a pressure-side automatic swimming pool cleaner.

FIGS. 1–2 illustrate an exemplary device 10 of the present invention. Device 10 may include head 14 as well as cartridge 18 in which water purification media 20 (shown conceptually) is placed. Media 20 may comprise pellets, foam, or any other suitable mechanism or item adapted to inhibit growth of, or kill, bacteria, algae, or any other undesirable material contained in water to be used recreationally by humans. Because the invention contemplates water flowing through cartridge 18, it includes one or more of both (nominally) upper and lower slots 22 and 26, respectively, intermediate which media 20 is positioned. Although constituents of media 20 may leach or be abraded into (or otherwise be carried with) the stream of water flowing through cartridge 18, media 20 preferably is formed, sized, placed in a porous bag, or otherwise acted upon so that it generally is retained within the cartridge 18 rather than being able to escape in bulk through slots 22 or 26 (which need not necessarily be elongated but rather may be of any desired shape).

Also shown in FIG. 1 is optional float 30 and, in FIGS. 1–2, inlet/outlet tube 34. Float 30 is particularly useful when device 10 is used with a suction-side cleaner, as it avoids excessive sinking of the device 10 within the pool by providing additional buoyancy. Float 30 usually is unnecessary when device 10 is used with a pressure-side cleaner, however, and thus is not shown in the exemplary device 10 of FIG. 2.

Tube 34 provides the primary flow path through device 10 from the automatic swimming pool cleaner to the filtration system of the pool. Although referred to herein as a "tube" for convenience, tube 34 need not necessarily be wholly, or even partly, tubular in shape. Instead, any structure adapted to permit fluid flow therethrough may be acceptable in certain circumstances. Nonetheless, tube 34 preferably is tubular, with ends 38 and 42 adapted to connect to hoses conventionally used with automatic swimming pool cleaners. As shown in FIG. 2, ends 38 and 42 may have terminal rings or flanges 46 fitted therein (or integrally formed therewith or connected thereto) if useful for connection to hoses used typically with pressure-side swimming pool cleaners. Although not shown in FIG. 1, such flanges 46 might also be appropriately used with certain hoses connecting to suction-side cleaners.

Tube 34 preferably is molded as part of head 14. Alternatively, tube 34 may be fitted within a corresponding opening through head 14. In either event, tube 34 either has a secondary opening 50 (shown in dotted lines in FIG. 2) or is formed of sections 52A and 52B with a cavity or gap 52C therebetween (see FIG. 1) within head 14 to allow fluid to communicate between the tube 34 and cartridge 18. Float 30, if present between tube 34 and cartridge 18, likewise has an opening 54—which can be aligned generally with gap 52C—to continue the fluid flow path. When tube 34 is indeed tubular, float 30 may be shaped in some respects similar to a saddle to provide a recessed area 58 in which portions of sections 52A and 52B may fit.

In embodiments of device 10 consistent with FIGS. 1–2, cartridge 18 comprises (nominally) upper part 62 and (nominally) lower part 66. Parts 62 and 66 are designed, if desired, to be assembled (to form cartridge 18), disassembled (when, for example, media 20 needs to be replaced), and reassembled (for further use after the replacement of media 20). Shown in FIGS. 1—2 are (one or more) clips 70 depending from the interior of upper part 62, which clips 70 may snap into corresponding recesses 74 in the interior of lower part 66. If such a snap-fit technique is employed, clips 70 can be sufficiently resilient to unlatch to disassemble parts 62 and 66. However, those skilled in the art will recognize that numerous other techniques for fastening and unfastening parts 62 and 66 may be utilized consistent with the present invention. Alternatively, clips 70 can fix in place within recesses 74 (and not be removable therefrom), in which event cartridge 18 may be replaced in its entirety when the purification capability of media 20 is depleted.

Upper part 62, furthermore, is illustrated as having exterior threads 78 intended to engage corresponding interior threads (not shown) of head 14. Such engagement connects cartridge 18 to head 14 to provide device 10; it also at least partially seals cartridge 18 to head 14. Again, however, those skilled in the relevant field will understand that other connectors and connecting methods may be used without exceeding the scope of the present invention.

FIGS. 1–2, finally, additionally illustrate optional wheel 82 which, if present, may be attached to head 14. Wheel 82 includes information (such as a pointer or the months of the year) to facilitate determination of a consumer as to when to replace media 20 within cartridge 18. Depending on the technique chosen to display the date-related information, wheel 82 may need to be detachable from head 14 for replacement or reprogramming when media 20 is replaced.

For use with a suction-side automatic swimming pool cleaner, device 10 is positioned so that at least slots 26 are below the water line of a swimming pool. A hose (or other suitable component) connects end 38 to the outlet of the automatic pool cleaner, while another hose (or other suitable component) connects end 42 to the filtration system of the pool and, indirectly, the inlet of a pump. As the pump is activated and suction induced, debris-laden water is drawn through the automatic pool cleaner and into the connecting hose. End 38, functioning as an inlet, receives the debris-laden water and permits it to pass through tube 34 (including past gap 52C) to end 42 (functioning as an outlet) and thence on to the pool filtration system. In this respect, tube 34 operates merely as a conduit between the connecting hoses.

However, suction caused by activating the pump and Venturi action associated with the flow through tube 34 also induce water to flow from the pool into cartridge 18 through slots 26. This water, usually having less debris entrained therein than that passing through the automatic swimming pool cleaner, contacts purification media 20 within cartridge 18 (and thereby is treated chemically) before being withdrawn from cartridge 18 through slots 22. The suction continues by drawing the treated water through both opening 54 of float 30 (if present) and gap 52C, where it joins the water stream from the automatic pool cleaner. The joined streams thereafter exit tube 34 through end 42 and pass to the filtration system for filtering and subsequent recirculation in the pool.

As illustrated in FIGS. 1–2, slots 22 may be made smaller than slots 26. Doing so causes slots 22 to govern the fluid flow rate through cartridge 18 when device 10 is used with a suction-side cleaner. Making slots 22 of lesser size than slots 26 thus reduces the amount of suction used to draw water through cartridge 18, permitting the majority of the pressure reduction to remain available to power the suction-side automatic pool cleaner. When the suction-creating pump is not operating, the fact that slots 26 are larger allows greater exposure of pool water to media 20 through (in essence, its passively) soaking into cartridge 18.

When device 10 is used with a pressure-side cleaner, filtered water exiting the filtration system of the pool passes into end 38, through tube 34, and out end 42 to the pressure-side cleaner. Such water is pressurized, however, and some of the filtered water is forced through secondary opening 50 (see FIG. 2) down through slots 22 into cartridge 18. In cartridge 18 the filtered—and thus again relatively debris-free—water is treated by media 20 before being forced through slots 26 into the swimming pool.

Because device 10 typically has multiple slots 22, secondary opening 50 likely provides the smallest aperture in this water path. Accordingly, in such cases when device 10 is used with a pressure-side pool cleaner, secondary opening 50 (rather than slots 22) governs the flow rate through cartridge 18. As a consequence, appropriate sizing of secondary opening 50 will allow function of device 10 without significant detrimental effect on the operation of the automatic pool cleaner.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A device for treating water in a swimming pool having a filtration system comprising a pump and in which a swimming pool cleaner operates below the water line, comprising:

a. a head (i) adapted in use to allow water to flow between the pump and swimming pool cleaner and (ii) having an inlet, an outlet, and a secondary opening or gap; and b. a cartridge connected to the head and having (i) a first opening, (ii) a second opening, and (iii) chemical water-treatment media contained therein, the first opening intended in use to be positioned within the swimming pool below the water line and the second opening positioned between the secondary opening or gap and the media, permitting water to flow between the secondary opening or gap and the media.

2. A device according to claim 1 in which at least a portion of the head is tubular, with the inlet and outlet defining opposite ends of the tubular portion each adapted for connection to a hose.

3. A device according to claim 1 in which the cartridge comprises upper and lower parts, the first opening being located in the lower part and the second opening being located in the upper part.

4. A device according to claim 3 in which the cartridge further comprises means for connecting the upper and lower parts.

5. A device according to claim 4 in which the connecting means comprises at least one clip depending from the upper part and at least one recess in the lower part in which the clip may be fitted.

6. A device according to claim 5 further comprising a float interposed between the secondary opening or gap and the cartridge.

7. A method of treating water in a swimming pool having a filtration system comprising a pump and in which an automatic pressure-side swimming pool cleaner operates below the water line, comprising:

a. activating the pump so as to cause a first quantity of pressurized water to travel from the filtration system to the swimming pool cleaner through a device positioned within the swimming pool at least partially below the water line; and b. using media contained within the device, chemically treating the water flowing through the device.

8. A method according to claim 7 further comprising diverting a second quantity of pressurized water arriving from the filtration system into contact with the media and thence into the swimming pool.

9. A device according to claim 1 in which the cartridge is adapted for (i) disassembly in order to access the media contained therein and (ii) reclosure following replacement of the media.

10. A device for treating water in a swimming pool having a filtration system comprising a pump and in which a swimming pool cleaner selected from the group consisting of automatic suction- and pressure-side cleaners operates below the water line, comprising:

a. a head (i) adapted in use to allow water to flow between the pump and the swimming pool cleaner and (ii) having an inlet, an outlet, and a secondary opening or gap; and b. a cartridge connected to the head, adapted for use with either type of cleaner, and having (i) a first opening, (ii) a second opening, and (iii) chemical water-treatment media contained therein, the first opening intended in use to be positioned within the swimming pool below the water line and the second opening permitting water to flow between the secondary opening or gap and the media.

11. A device according to claim 10 in which at least a portion of the head is tubular, with the inlet and outlet defining opposite ends of the tubular portion each adapted for connection to a hose.

12. A device according to claim 10 in which the cartridge comprises upper and lower parts, the first opening being located in the lower part and the second opening being located in the upper part.

13. A device according to claim 12 in which the cartridge further comprises means for connecting the upper and lower parts.

14. A device according to claim 10 in which the first opening is larger than the second opening.

15. A device according to claim 1 in which the first opening is larger than the second opening.

16. A method of treating water in a swimming pool having a filtration system comprising a pump and in which a swimming pool cleaner operates below the water line, comprising:

a. providing a device defining a cartridge comprising (i) a top, (ii) a bottom, (iii) a first opening in the bottom, (iv) a second opening in the top, and (v) chemical water-treatment media contained therein between the first and second openings;

b. positioning the device within the pool so that the first opening is below the water line and the device is interposed between the swimming pool cleaner and the filtration system;

c. establishing water flow to or from the swimming pool and between the first and second openings of the device; and d. using the chemical water-treatment media, chemically treating the water flowing to or from the swimming pool between the first and second openings of the device.

17. A method according to claim 16 in which positioning the device within the pool so that the first opening is below the water line comprises continuously exposing the first opening to the water within the swimming pool.

18. A device according to claim 10 in which the cartridge can be disconnected and reconnected to the head.

19. A device according to claim 10 further comprising a float interposed between the secondary opening or gap and the cartridge.

20. A device according to claim 1 in which the cartridge can be disconnected and reconnected to the head.

21. A device according to claim 1 further comprising a float interposed between the secondary opening or gap and the cartridge.

\* \* \* \* \*